(12) United States Patent
Ito (10) Patent No.: US 9,425,465 B2
(45) Date of Patent: Aug. 23, 2016

(54) CATALYST CARRYING FINE METAL PARTICLES AND USE THEREOF

(75) Inventor: Masaaki Ito, Nagoya (JP)

(73) Assignee: NORITAKE CO., LTD., Nagoya-shi (JP)

( * ) Notice: Subject to any disclaimer, the term of this patent is extended or adjusted under 35 U.S.C. 154(b) by 853 days.

(21) Appl. No.: 13/581,384

(22) PCT Filed: Nov. 30, 2010

(86) PCT No.: PCT/JP2010/071341
§ 371 (c)(1),
(2), (4) Date: Aug. 27, 2012

(87) PCT Pub. No.: WO2011/108162
PCT Pub. Date: Sep. 9, 2011

(65) Prior Publication Data
US 2012/0321996 A1    Dec. 20, 2012

(30) Foreign Application Priority Data

Mar. 1, 2010   (JP) ................. 2010-044101

(51) Int. Cl.
| H01M 4/90 | (2006.01) |
| H01M 4/92 | (2006.01) |
| H01M 4/88 | (2006.01) |
| H01M 4/86 | (2006.01) |

(52) U.S. Cl.
CPC .............. *H01M 4/92* (2013.01); *H01M 4/8657* (2013.01); *H01M 4/926* (2013.01); *Y02E 60/50* (2013.01)

(58) Field of Classification Search
None
See application file for complete search history.

(56) References Cited

U.S. PATENT DOCUMENTS

| 7,022,642 B2 | 4/2006 | Yamamoto |
| 7,205,255 B2 | 4/2007 | Yamamoto |
| 8,227,372 B2 | 7/2012 | Lopez et al. |
| 2005/0003959 A1 | 1/2005 | Yamamoto |
| 2005/0075240 A1* | 4/2005 | Yamamoto .......... H01M 4/8605 502/101 |
| 2006/0196310 A1 | 9/2006 | Toshima et al. |
| 2009/0117257 A1* | 5/2009 | Monnier ............. C23C 18/1635 427/8 |

(Continued)

FOREIGN PATENT DOCUMENTS

| JP | A-2004-149847 | 5/2004 |
| JP | A-2004-332028 | 11/2004 |

(Continued)

OTHER PUBLICATIONS

Office Action issued in Japanese Patent Application No. 2012-502965 dated May 29, 2014 (with translation).

(Continued)

*Primary Examiner* — Barbara Gilliam
*Assistant Examiner* — Adam A Arciero
(74) *Attorney, Agent, or Firm* — Oliff PLC (57) ABSTRACT

The production method according to the present invention includes a process for producing fine particles formed of a non-precious metal; a process for forming a shell of a precious metal on the respective surfaces of the fine particles of the non-precious metal; and a process for collecting a catalyst from a fluid reaction mixture. A fine metal particle-carrying catalyst prepared by such a production method includes fine non-precious metal particles as the cores thereby reducing the usage of a precious metal to achieve suppression of a cost increase. Since it includes a shell portion formed of a precious metal, it exhibits excellent catalytic activity.

10 Claims, 3 Drawing Sheets

(56) References Cited

U.S. PATENT DOCUMENTS

| | | |
|---|---|---|
| 2010/0086832 A1 | 4/2010 | Lopez et al. |
| 2010/0105548 A1* | 4/2010 | Zhang .................. B01J 23/892 502/313 |

FOREIGN PATENT DOCUMENTS

| | | |
|---|---|---|
| JP | A-2005-034836 | 2/2005 |
| JP | A-2005-135900 | 5/2005 |
| JP | A-2005-270873 | 10/2005 |
| JP | A-2008-153192 | 7/2008 |
| JP | A-2008-297626 | 12/2008 |
| JP | A-2010-501344 | 1/2010 |
| WO | WO 2008025750 A1 * | 3/2008 |

OTHER PUBLICATIONS

International Preliminary Report on Patentability issued in Application No. PCT/JP2010/071341; Dated Sep. 4, 2012 (With Translation).

International Search Report issued in Application No. PCT/JP2010/071341; Dated Feb. 1, 2011 (With Translation).

* cited by examiner

CATALYST CARRYING FINE METAL PARTICLES AND USE THEREOF

TECHNICAL FIELD

The present invention relates to a fine metal particle-carrying catalyst comprising fine metal particles containing a catalytic precious metal on a carbon carrier as well as a method for producing the same. It also relates to use of the fine metal particle-carrying catalyst. In particular, it relates to a fuel cell in which the fine metal particle-carrying catalyst is used as an electrode catalyst. The present application claims priority to Japanese Patent Application No. 2010-044101 filed on Mar. 1, 2010 and the entire contents of the Japanese application are incorporated in this description by reference.

BACKGROUND ART

Catalysts obtained by depositing particles of catalytic platinum or other catalytic precious metals on the surface of an appropriate carrier (e.g., a carbon carrier) have been widely used for applications such as exhaust emission cleaning or as an electrode in a fuel cell. For example, as the electrode catalyst of a polymer electrolyte-based fuel cell (also called PEFC: polymer electrolyte fuel cell), have been used precious metal-carrying catalysts wherein particles of a catalytic precious metal (typically, a platinum group element) are supported on a carbon carrier.

One of the requirements for development of a precious metal-carrying catalyst is reduction of the manufacturing cost. That is, to reduce the usage (carried amount) of a precious metal such as platinum, which is a factor contributing to a high cost, without lowering the catalytic performance. One of the means considered to achieve such an objective is to refine precious metal particles, that is, in other words, to employ nano-pulverization where the average particle diameter is reduced to an order of nm (typically, to about 1 nm to 100 nm average particle diameter based on electron microscopy (e.g., TEM) analysis). By the nano-pulverization, the exposed surface area in the precious metal particles is increased and the amount of the precious metal (platinum, etc.,) used per unit mass can be reduced.

Excessive nano-pulverization, however, may result in a decrease in the catalytic activity and thus is not preferred in view of maintaining the performance as the catalyst. For instance, with nano-pulverized platinum (Pt), when the particle diameter becomes below about 2.5 nm, the oxygen reduction activity per particle is likely to significantly decrease. Therefore, nano-pulverization seems to be limited to around 3 nm in view of maintaining the catalytic activity.

Alternatively, use of metal particles having a so-called core-shell structure where the catalytically non-active particle core is formed of a metal other than an expensive precious metal (i.e., a metal belonging to the non-precious metal group) has been also considered. For example, Patent Document 1 discloses a precious metal-containing catalyst in which a precious metal such as platinum is deposited on the surfaces of core particles formed of cobalt, iron, nickel or tungsten in order to reduce the usage of the precious metal element. The other related technical documents of this kind include Patent Documents 2 to 4 though the arts described in these do not directly contribute to achievement of the aforementioned objective.

CITATION LIST

Patent Literatures

[Patent Document 1] Japanese Patent Application Publication No. 2008-153192.
[Patent Document 2] Japanese Patent Application Publication No. 2004-149847.
[Patent Document 3] Japanese Patent Application Publication No. 2004-332028.
[Patent Document 4] Japanese Patent Application Publication No. 2008-297626.

SUMMARY OF INVENTION

In the art described in Patent Document 1, however, for producing a precious metal-containing catalyst, a prescribed metal is deposited by displacement plating, spattering, or vacuum deposition on the surfaces of core particles which have been already supported by a carbon carrier. With catalyst particles constituted with core particles obtained by these methods and a precious metal element present on the surfaces of these core particles, there exist problems such as too large a particle diameter (e.g., displacement plating), insufficient deposition of the precious metal element on the core particle surfaces (e.g., spattering or vacuum deposition), etc., and thus, it is difficult to produce, on a carrier of a carbon, etc., fine metal particles having a core-shell structure suitable for achieving the aforementioned objective.

Thus, this invention has been made in order to achieve the above-mentioned objective by a non-conventional method. It provides a catalyst carrying fine metal particles having a core-shell structure (a fine metal particle-carrying catalyst) that exhibits excellent catalytic activity while suppressing an increase in cost by reducing the usage of a precious metal. In addition, this invention provides a method for preferably producing a catalyst of such a structure. Moreover, this invention provides a fuel cell (typically, a PEFC) constituted with a catalyst of such a structure.

In order to achieve the aforementioned objective, the present invention provides a method for producing a fine metal particle-carrying catalyst comprising the following components.

The production method disclosed herein fabricates a fine metal particle-carrying catalyst comprising a carrier (a conductive carrier) formed of a conductive material and core-shell structured fine metal particles supported on the carrier, wherein the shell portion is formed of a precious metal and the core portion is formed of a metal less precious than that of the shell portion. The production method disclosed herein comprises a process for producing fine particles formed of a non-precious metal by subjecting a compound containing the core-forming non-precious metal element to reduction in a fluid reaction mixture in the presence of the carrier, but in absence of the precious metal; a process for forming a shell of the precious metal on the respective surfaces of the fine non-precious metal particles as the cores by adding a compound containing the shell-forming precious metal element to the fluid reaction mixture in which the carrier and the fine particles of the non-precious metal produced by the reduction are present and further reducing this compound; and a process for collecting, from the fluid reaction mixture, a catalyst in which fine metal particles are supported on the carrier, with each metal particle having a shell portion formed of the precious metal and a core portion formed of the non-precious metal.

The present inventors have come to complete this invention by researching methods for forming core-shell structured fine metal particles, which may replace the displacement plating method or the spattering method described in Patent Document 1, and inventing the two-step reductions having the above-described processes.

In particular, according to the production method disclosed herein, core particles formed of a non-precious metal are first prepared by reducing a compound containing a non-precious metal that has a higher tendency to ionize than that of a precious metal in a fluid reaction mixture (typically, in a dispersion, etc.,) in which a conductive carrier is present, but the desired precious metal is absent. Following this, to the fluid reaction mixture, a compound containing the desired precious metal element is added and this compound is reduced. This allows formation of a precious metal layer on the respective surfaces of the pre-formed core particles formed of the non-precious metal, with the precious metal layer having been deposited via reduction by the reduction process. In other words, by carrying out the two-step reductions, an extremely thin precious metal layer (typically, a 2 to 10-atom thick layer) can be formed on the surface of the core portion composed of the non-precious metal. Typically, a non-precious metal-precious metal alloy layer is formed between the core portion formed of a non-precious metal and the outermost precious metal layer.

Therefore, according to this invention's production method comprising the above processes, by depositing the desired precious metal on the catalytically active surfaces of the fine metal particles while forming the catalytically inactive inner portion with a non-precious metal, can be provided a catalyst carrying fine metal particles excellent for practical use with reduced usage of the precious metal, which is a factor contributing to a cost increase.

Preferably, the extents of the reduction processes (reaction times, concentration of the reducing agent) and the concentrations of the starting compounds contained in the fluid reaction mixture should be adjusted so that the core-shell structured fine metal particles are produced to have an average particle diameter of about 3 nm to 15 nm.

In a preferred embodiment of the production method disclosed herein, as the compound containing a precious metal element, a salt or a complex of a metal belonging to the platinum group is used; and as the compound containing a non-precious metal element, a salt or a complex of a metal belonging to the iron group is used.

With a combination of these starting compounds, the two-step reductions can be preferably carried out and fine metal particles having a preferred core-shell structure can be formed. Thus, a desired fine metal particle-carrying catalyst can be produced more preferably. In particular, as the compound containing a non-precious metal element, a nickel salt is preferably used.

In a preferred embodiment of the production method disclosed herein, a reducing agent is added to the fluid reaction mixture containing the compound having a non-precious metal element as well as the carrier in order to form fine particles comprising the non-precious metal; and the compound containing a precious metal element is further added to the fluid reaction mixture containing the formed fine particles in order to form a shell of the precious metal on the respective surfaces of the fine particles of the non-precious metal.

According to a production method comprising such processes, in the first reduction process to form the core portions (core particles), a prescribed reducing agent is added to the fluid reaction mixture and after the formation of the core particles, to the same fluid reaction mixture, is added a compound containing a precious metal element that is more readily reducible as compared to the non-precious metal. This allows efficient formation of fine metal particles having a desired core-shell structure.

In another preferred embodiment of the production method disclosed herein, as the carrier, is used a carrier formed of a conductive carbon.

By using a carrier formed of a conductive carbon (e.g., powder of a conductive carbon such as carbon black, etc.,), can be produced a catalyst excellent in conductivity. Such a catalyst can be used preferably, for example, as an electrode catalyst in a fuel cell (e.g., a polymer electrolyte fuel cell described above).

In order to accomplish the above objective, the present invention provides a catalyst that can be preferably produced by the production method disclosed herein. In particular, the catalyst disclosed herein is a fine metal particle-carrying catalyst comprising a carrier formed of a carbonaceous material and core-shell structured fine metal particles supported on the carrier, wherein the shell portion is formed of a precious metal and the core portion is formed of a metal less precious than that of the shell portion.

With a fine metal particle-carrying catalyst of such a structure, the usage of a precious metal has been reduced and it is useful especially in terms of cost performance.

Preferably, the fine metal particles are characterized to have an average particle diameter of 3 nm to 15 nm based on electron microscopy analysis. By comprising fine metal particles of such a core-shell structure, it enables suppression of a cost increase while exhibiting high catalytic activity. Especially preferred is a catalyst carrying core-shell structured fine metal particles comprising a thin precious metal layer that is an approximately 2 to 10-atom thick layer.

In another preferred embodiment, the fine metal particle-carrying catalyst disclosed herein is characterized by that the shell portion of the respective fine metal particles is formed of a metal belonging to the platinum group (platinum, rhodium, palladium, etc.,) and the core portion of the fine metal particles is formed of a metal belonging to the iron group (nickel, iron, cobalt, etc.). Core-shell structured fine metal particles formed of such a combination of a precious metal and a non-precious metal allows to achieve a good cost reduction while exhibiting excellent catalytic activity.

In another preferred embodiment, the fine metal particle-carrying catalyst disclosed herein is characterized by that the carrier is formed of a conductive carbon (e.g., powder such as carbon black, etc., or fine structures such as carbon nanotubes). According to such a composition, good conductivity can be obtained and thus it is preferable, for instance, as a catalyst for a fuel cell.

Hence, the present invention provides, in another aspect, a fuel cell (e.g., a polymer electrolyte fuel cell) comprising an electrode that comprises such a conductive fine metal particle-carrying catalyst.

DESCRIPTION OF EMBODIMENTS

Preferred embodiments of the present invention are described below. Matters necessary to practice this invention other than those specifically referred to in this description may be understood as design matters based on the conventional art in the pertinent field for a person of ordinary skills in the art. The present invention can be practiced based on the contents disclosed in this description and common technical knowledge in the pertinent field.

Disclosed herein is a method for producing a fine metal particle-carrying catalyst comprising a carrier formed of a conductive material (hereinafter, it is referred to as a "conductive carrier".), and core-shell structured fine metal particles supported on the carrier, wherein the shell portion is formed of a precious metal and the core portion is formed of a metal less precious that that of the shell portion. Such a production method comprises (1) a process for producing fine particles formed of a non-precious metal; (2) a process for forming a shell portion made of a non-precious metal on the respective surfaces of the fine particles of the non-precious metal; and (3) a process for collecting a fine metal particle-carrying catalyst in which the fine metal particles are supported on a carrier.

In this description, materials that can be preferably used in this production method are first described. Note that the following detail is not intended to limit the present invention.

The precious metal forming the shell portion of the core-shell structured fine metal particles will be discussed first. As the precious metal, a catalytic metal element can be preferably used. For example, can be used gold (Au), silver (Ag), platinum (Pt), palladium (Pd), rhodium (Rh), iridium (Ir), ruthenium (Ru), osmium (Os), compounds containing these metal elements, alloys of these metals, and so on. From standpoint of obtaining good catalytic performance, of these precious metals, metals belonging to the platinum group (platinum, palladium, iridium, ruthenium, osmium) are especially preferable for use.

On the other hand, as the metal forming the core portion of the core-shell structure, can be used a metal less precious than the precious metals (i.e., a metal element other than the aforementioned precious metals, which are conventionally referred to as "non-precious metals" in the following description). As such non-precious metals, can be used, for example, aluminum (Al), titanium (Ti), vanadium (V), chromium (Cr), manganese (Mn), iron (Fe), cobalt (Co), nickel (Ni), copper (Cu), zinc (Zn), molybdenum (Mo), cadmium (Cd), tin (Sn), lead (Pd), bismuth (Bi), tungsten (W), compounds containing these metal elements, alloys of these metals, and so on. Catalytic activity is not necessarily required for the non-precious metal and it can be selected in view of the production cost, the stability of the core portion, and so on. In this case, of the above-mentioned non-precious metals, metals belonging to the iron group (especially, iron and nickel) can be used preferably.

In the production method disclosed herein, the precious metal and the non-precious metal are supplied in forms of compounds to the production processes. Any compound that can produce fine particles of a precious metal or those of a non-precious metal upon reduction can be used here. In the following, the respective compounds will be discussed in detail.

As the compound containing a precious metal element, a salt or a complex of the precious metal can be preferably used. As the precious metal salt, can be used, for example, halides such as chlorides, bromides, iodides, etc.; hydroxides; sulfides; sulfates; nitrates; as well as complex oxides such as potassium complex oxides, ammonium complex oxides, sodium complex oxides, etc.; and so on. As the precious metal complex, can be used amine complexes, cyanide complexes, halogeno complexes, hydroxy complexes, and so on.

Though not intended to limit the present invention, as the compound containing a precious metal element, a salt or a complex of a metal (e.g., platinum) belonging to the platinum group can be used. In the embodiment where platinum is used as the precious metal, examples of the precious metal compound include hydrogen hexachloroplatinate(IV) hexahydrate ($H_2(PtCl_6) \cdot 6H_2O$), platinum(IV) chloride, platinum(II) bromide, platinum(II) iodide, platinum(IV) sulfide, potassium tetrachloroplatinate(II), ammonium tetrachloroplatinate(II), sodium hexachloroplatinate(IV) hexahydrate, platinum(II) hexafluoroacetylacetonate complex, platinum(II) acetylacetonate complex, and so on.

On the other hand, as the compound containing a non-precious metal element, a salt of the non-precious metal can be preferably used. As the non-precious metal salt, can be used, for instance, chlorides, hydroxides, borides, bromides, iodides, sulfides, carbonates, sulfates, nitrates, oxalates, perchlorates, and so on.

Though not intended to limit the present invention, as the compound containing a non-precious metal, a salt of a metal belonging to the iron group (e.g., nickel) may be used. In the embodiment where nickel is used as the nonprecious metal, examples of the non-precious metal compound include nickel (II) chloride hexahydrate ($NiCl_2 \cdot 6H_2O$), nickel(II) nitrate hexahydrate ($Ni(NO_3)_2 \cdot 6H_2O$), nickel 2-ethylhexanoate (Ni $(C_8H_{15}O_2)$), nickel(II) sulfate hexahydrate ($NiSO_4 \cdot 6H_2O$), nickel(II) perchlorate hexahydrate ($Ni(ClO_4)_2 \cdot 6H_2O$), nickel (II) acetate tetrahydrate ($Ni(CH_3COO)_2 \cdot 4H_2O$), and so on.

The carrier for supporting core-shell structured fine metal particles will be discussed next. Such a carrier is formed of a conductive material, with examples including a conductive carbon, perovskite-based conductive ceramics such as ZnO, $SnO_2$, $TiO_2$, and so on (more preferably, a conductive carbon). When a conductive carbon is used as the carrier, can be preferably used fine structures such as carbon black, carbon nanotubes, carbon nanohorns, carbon nanofibers, and so on (typically, carbon black). With use of such a carrier, good conductivity can be attained; and therefore, can be prepared a fine metal particle-carrying catalyst that can be used preferably, for instance, in a fuel cell.

The average particle diameter of the conductive carrier (here, referring to the average particle diameter determined by electron microscopy analysis; in the following description, "average particle diameter" indicates a value determined by the same method.) can be, for example, 10 nm to 100 nm, preferably 20 nm to 70 nm, or more preferably about 30 nm to 50 nm.

The fluid reaction mixture in which the respective materials described above are reacted will be discussed next.

The fluid reaction mixture in the production method disclosed herein can be a solution obtained by dissolving the respective materials in a solvent or a dispersion obtained by dispersing the respective materials in a dispersion medium (in this description, the "dispersion" encompasses a sol and a gel). The solvent (dispersion medium) forming the fluid reaction mixture can be an aqueous solvent (an aqueous dispersion medium) or an organic solvent (an organic dispersion medium).

When preparing the fluid reaction mixture with an aqueous solvent (an aqueous dispersion medium), as the solvent, water or a water-containing solution (e.g., a solution mixed of water and ethanol) can be used. In the case of an organic solvent (an organic dispersion medium), can be used a polar solvent, etc., including alcohols such as methanol, ethanol, etc.; ketones such as acetone, methyl ketone, etc.; esters such as ethyl acetate, etc.

The materials that can be preferably used in the production method disclosed herein have been discussed above. The respective processes in this production method will be described next.

<(1) Process for Producing Fine Particles Formed of a Non-Precious Metal>

In the production method disclosed herein, firstly, fine particles formed of a non-precious metal are produced by reducing a compound containing a core-forming non-precious metal element in a fluid reaction mixture in which a conductive carrier is present, but a precious metal is absent. This process (1) can be easily carried out, for example, by adding a reducing agent to a fluid reaction mixture containing a compound having a non-precious metal element and a carrier.

In this process (1), the fluid reaction mixture is first prepared by mixing the compound containing a core-forming non-precious metal element and the conductive carrier in a solvent (or a dispersion medium). Each material content may vary depending on the purpose and the type of the material and thus is not especially limited. For instance, when one of the iron group (e.g., nickel) is selected as the non-precious metal and the solvent is water or an aqueous solvent (e.g., a solvent mixed of water and ethanol), in order to produce core-shell structured fine metal particles having an average particle diameter of 3 nm to 15 nm as described above, the fluid reaction mixture is preferably prepared to contain the non-precious metal compound at a molarity of 0.5 M to 4 M (more preferably at 0.75 M to 2 M, e.g., 1 M). When a conductive carbon is used as the conductive carrier, relative to 100 parts by mass of the fluid reaction mixture, such a conductive carbon can be contained in an amount of 2 parts by mass to 20 parts by mass (more preferably 5 parts by mass to 10 parts by mass).

When preparing the fluid reaction mixture, various additives can be added other than the materials mentioned above. Examples of such additives include a complexing agent. As the complexing agent, can be used, for example, hydrazine hydrate ($N_2H_4 \cdot H_2O$), aqueous ammonia, potassium cyanide, etc. When a suitable amount of the complexing agent is added to the fluid reaction mixture, a complex having the non-precious metal as the central metal ion is formed in the fluid reaction mixture. With this, in the reduction process described later, fine particles of the non-precious metal can be readily precipitated out.

The fluid reaction mixture should be prepared with stirring while keeping the temperature within a prescribed range. The temperature here may be around 20° C. to 60° C. (more preferably, 30° C. to 50° C.). The rotation speed of the stirring can be about 100 rpm to 500 rpm (more preferably 200 rpm to 300 rpm).

The reduction in the process (1) is discussed next. This reduction process can be carried out, for example, by adding a reducing agent to the fluid reaction mixture. As the reducing agent to be added here, can be used, for example, sodium citrate dihydrate ($Na_3C_6H_5O_7 \cdot 2H_2O$), oxalic acid ($C_2H_2O_4$), sodium acetate ($NaCH_3COOH$), sodium borohydride ($NaBH_4$), sodium thiosulfate ($Na_2S_2O_3$), and so on. In the reduction process, this reducing agent can be added at an amount of 0.02 part by mass to 0.2 part by mass (more preferably 0.05 part by mass to 0.1 part by mass) relative to 100 parts by mass of the fluid reaction mixture (a solution or a dispersion medium). In the reduction process, it is more preferable to adjust the pH to 9 to 11 (e.g., about pH 9) by adding a pH adjusting agent to the fluid reaction mixture.

Here, as the pH adjusting agent, can be used, for example, sodium hydroxide (NaOH), aqueous ammonia, or other basic substances.

In such a reduction process, the fluid reaction mixture is preferably maintained for a prescribed time (1 hour to 6 hours, preferably 1 hour to 4 hours, e.g., about 2 hours) after the addition of the reducing agent. Keeping the fluid reaction mixture over a long time (e.g., 20 hours or longer) is not preferred since the surface reactivity of the precipitated fine particles of the non-precious metal decreases and the core-shell structure is less likely to form.

Here, the temperature of the fluid reaction mixture should be maintained at 20° C. to 60° C. (more preferably, 20° C. to 50° C., e.g., 40° C.). More preferably, homogenization is carried out while the fluid reaction mixture is maintained. Examples of the homogenization method include ultrasonic homogenizer, ultrasonic disperser, ultrasonic bath sonicator, etc. Of these, use of ultrasonic homogenizer is especially preferred. In this case, a preferred ultrasonic homogenizer may be able to carry out homogenization at a frequency of about 15 kHz to 50 kHz and an output of about 100 W to 500 W.

<(2) Process for Forming a Shell of a Precious Metal on the Surfaces of Fine Particles of the Non-Precious Metal>

In the production method disclosed herein, secondly, by adding a compound containing a shell-forming precious metal element to the fluid reaction mixture in which the carrier and the fine particles of the non-precious metal formed by the reduction process are present, a shell portion composed of the non-precious metal is formed on the respective surfaces of the fine particle cores formed of the non-precious metal. This process (2) can be easily carried out by adding a compound containing a precious metal element to the fluid reaction mixture in which fine particles of the non-precious metal have been formed via the process (1).

In this process (2), a compound containing a precious metal element is added to the fluid reaction mixture after the reduction of the non-precious metal compound has been carried out. The amount of the precious metal compound to be added may vary depending on the purpose and the kind of the material and thus is not especially limited. Here, as an example, the added amount will be described with respect to a case where as the precious metal, one of the platinum group (e.g., platinum) is selected and the shell portion is aimed to form a 2 to 10-atom thick layer. In this case, the proportion of the precious metal compound to be mixed in can be determined so that the molarity of the precious metal compound be 0.2 M to 2 M (more preferably 0.3 M to 1 M, e.g., about 0.5 M) in the resulting fluid reaction mixture. When adding the precious metal compound to the fluid reaction mixture, the fluid reaction mixture is preferably maintained within the aforementioned target temperature range with stirring.

In this process (2), subsequently, by reducing the precious metal compound added to the fluid reaction mixture, a shell of the precious metal is formed on the respective surfaces of the fine particles (cores) of the non-precious metal. The reduction process of the precious metal compound can be carried out by adding a precious metal compound to the fluid reaction mixture to which a reducing agent has been added. That is, this reduction process can take advantage of the reducing agent that had been added to the fluid reaction mixture in the preceding process and can be carried out by maintaining the reaction system after the precious metal compound is added to the fluid reaction mixture. Alternatively, a fresh reducing agent can be added at this reduction process.

As the reduction process of the precious metal compound is carried out, fine precious metal particles precipitate out in the fluid reaction mixture. In the production method disclosed herein, two-step reductions are carried out where the reduction of the precious metal compound is carried out after the reduction of the non-precious metal compound. In other words, by the reduction in the process (1), fine particles of a non-precious metal having a greater tendency to ionize than the fine precious metal particles had been formed already and fine particles of the precious metal are deposited on the surfaces of the pre-formed fine non-precious metal particles. This allows formation of core-shell structured fine metal particles in which a shell of the precious metal is formed on the respective surfaces of the fine particles of the non-precious metal as the cores.

In the reduction of the process (2), when a shell portion is formed of a precious metal in the surroundings of the fine particles of the non-precious metal, the shell portion is attached to a conductive carrier particle that is present in the fluid reaction mixture (a solution or a dispersion). In this way, in the fluid reaction mixture (a solution or a dispersion), is formed a catalyst in which a conductive carrier particle is carrying core-shell structured fine metal particles (fine metal particle-carrying catalyst).

<(3) Process for Collecting a Fine Metal Particle-Carrying Catalyst>

In the production method disclosed herein, the produced fine metal particle-carrying catalyst is collected from the fluid reaction mixture. As the method for collecting the fine metal particle-carrying catalyst, various conventional methods can be employed. Examples of the method include filtration of the reaction mixture (a solution o a dispersion) followed by washing and drying of the remaining residue. In this case, the remaining residue can be washed with ion-exchanged water and allowed to dry at around 60° C. to 120° C. for about one to eight hours. The method for collecting the fine metal particle-carrying catalyst is not limited to this method and other examples include a method where the reaction mixture in which the fine metal particle-carrying catalyst has been formed is spray-dried followed by trapping of the particles in the gas phase.

Via the processes described above, according to the production method disclosed herein, is produced a catalyst in which the carrier particle is carrying fine metal particles, with each metal particle having a precious metal shell portion and a non-precious metal core portion.

According to the production method disclosed herein, core particles formed of a non-precious metal are initially produced by, in a fluid reaction mixture (typically, a reaction mixture such as a dispersion) wherein a conductive carrier is present, but the desired precious metal is absent, reducing a compound of a non-precious metal, which has a greater tendency to ionize than the precious metal. Subsequently, a compound containing the desired precious metal element is added to the fluid reaction mixture and this compound is reduced. By this, on the respective surfaces of the pre-formed non-precious metal core particles, a precious metal layer is formed by deposition upon the reduction process. In other words, by carrying out the two-step reductions, an extremely thin (about 2 to 10-atom thick) layer of a precious metal can be formed on the surface of a core portion formed of a non-precious metal.

Therefore, according to this invention's production method comprising the above processes, by depositing a precious metal on the catalytically active surfaces of the fine metal particles while forming the catalytically inactive inner portion of the fine metal particle with a non-precious metal, can be provided a practically usable catalyst carrying fine metal particles with which the usage of a cost-increasing precious metal has been reduced.

The production method disclosed herein provides a fine metal particle-carrying catalyst comprising a carrier formed of a carbonaceous material and core-shell structured fine metal particles carried thereon, wherein the shell portion is formed of a precious metal and the core portion is formed of a metal that is less precious than that of the shell portion. Because a non-precious metal is used for the central portion of the catalytic fine metal particle, with this fine metal particle-carrying catalyst, the usage of a precious metal is reduced and the catalyst is useful especially in terms of cost performance.

In the fine metal particle-carrying catalyst, fine metal particles supported on the carrier may have an average particle diameter of 1 nm to 20 nm (preferably 3 nm to 15 nm, or more preferably 3 nm to 10 nm). A catalyst comprising such core-shell structured fine metal particles can exhibit high catalytic activity while allowing suppression of a cost increase. In such fine metal particles, the core portion can have an average particle diameter of approximately 2 nm to 10 nm (typically 4 nm) and the shell portion can be an approximately 1 to 10-atom thick layer (preferably 2 to 10-atom thick layer or more preferably 2 to 5-atom thick layer). In the production method of the fine metal particle-carrying catalyst, various condition settings can be adjusted in order to prepare such fine metal particle-carrying catalyst.

With the fine metal particles in the catalyst prepared in this production method, a non-precious metal-precious metal alloy layer may be formed between the core portion formed of a non-precious metal and the shell portion formed of a precious metal. This happens as a non-precious metal-precious metal alloy sometimes forms when the precious metal starts to deposit on the surfaces of fine particles of the non-precious metal.

In the fine metal particle-carrying catalyst prepared by the above production method, preferably, the shell portion of the fine metal particle is formed of a metal belonging to the platinum group and the core portion of the fine metal particle is formed of a metal belonging to the iron group. In this case, a relatively inexpensive iron group metal is used for the core portion and a highly catalytic platinum group metal is used for the shell portion; and therefore, cost increase can be preferably suppressed while obtaining a high catalytic activity.

As described above, the fine metal particle-carrying catalyst disclosed herein can be preferably used for a PEFC.

Figure 1:
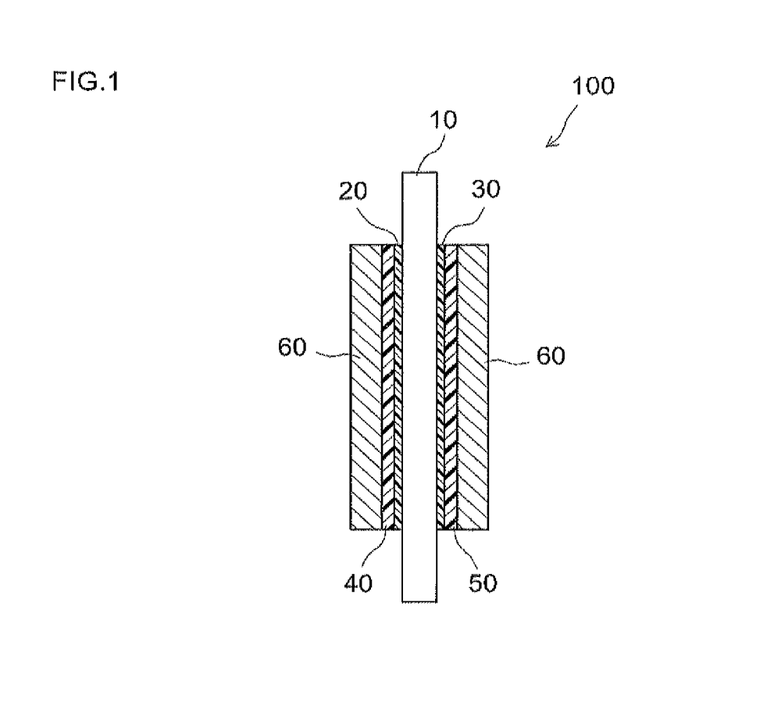
FIG. 1 shows a diagram illustrating a cross section of an electrode in a polymer electrolyte fuel cell according to an embodiment of the present invention.

A general PEFC is shown in FIG. 1. FIG. 1 shows a cross sectional diagram schematically illustrating electrode assembly 100, which is a basic structure of the PEFC. Electrode assembly (PEFC) 100 comprises a sheet of electrolyte membrane 10, fuel electrode 20 applied on one surface (the left surface in FIG. 1) of electrolyte membrane 10, and oxidizing agent electrode 30 applied on the other surface (on the right surface in FIG. 1) of electrolyte membrane 10. Fuel passing layer 40 is laminated on the outer surface of fuel electrode 20 while oxidizing agent passing layer 50 is laminated on the outer surface of oxidizing agent electrode 30. On the outer surfaces of fuel passing layer 40 and oxidizing agent passing layer 50, case 60 is placed, respectively. In such PEFC 100, fuel electrode 20 is the anode and oxidizing agent electrode 30 is the cathode. The fine metal particle-carrying catalyst disclosed herein can be preferably used, for example, as a catalyst contained in fuel electrode 20.

When using the fine metal particle-carrying catalyst in such PEFC 100, a conductive carbon (e.g., carbon black) can be used as the carrier for supporting the fine metal particles. Here, in the fine metal particles, nickel can be used for the core and platinum can be used for the shell portion. By using such a fine metal particle-carrying catalyst, while maintaining good catalytic activity, the production cost of the PEFC can be reduced. By layering a plurality of electrode assemblies 100, can be formed a fuel cell, i.e., a stack as a set of cells, capable of producing a practically useful voltages.

Preferred embodiments of the present invention are described above. In the following, examples according to the present invention are described. The examples described below are not intended to limit the present invention.

EXAMPLE 1

As a non-precious metal, nickel was used and as a compound containing nickel, a nickel salt, nickel(II) chloride hexahydrate ($NiCl_2.6H_2O$) was used. Here, 1.2 g of nickel(II) chloride hexahydrate ($NiCl_2.6H_2O$) was dissolved in 7 mL of pure water to prepare a 1 M aqueous nickel chloride solution. On a hot plate stirrer, the aqueous nickel chloride solution was stirred at a temperature of 40° C. and a stirring speed of 250 rpm. Subsequently, to the stirring aqueous nickel chloride solution, were added 5.0 g of hydrazine hydrate ($N_2H_4.H_2O$) as a complexing agent and 0.015 g of sodium citrate dihydrate ($Na_3C_6H_5O_7.2H_2O$) as a reducing agent. After 1.5 g of carbon black (available from Cabot Corporation, product name: Vulcan XC72), which was a carbonaceous carrier, was added as a conductive carrier, 5.0 g of 50 weight % aqueous sodium hydroxide solution was added as a pH adjusting agent until around pH 9.

Here, before adding a precious metal to the aqueous solution, nickel chloride, which was a non-precious metal compound, was reduced in the presence of carbon black, which was a conductive carrier. This reduction process was carried out by dispersing the aqueous nickel chloride solution containing the added reducing agent using an ultrasound homogenizer (20 kHz) for two hours while keeping the temperature at 40° C.

Subsequently, a compound containing a precious metal element was added and reduction of this compound was carried out. Here, as the precious metal element, platinum was used and as the platinum containing compound, a platinum salt, hydrogen hexachloroplatinate(IV) hexahydrate ($H_2(PtCl_6).6H_2O$), was used. To the above aqueous solution, was added 9.9 g of a 10 weight % aqueous chloroplatinate solution obtained by dissolving hydrogen hexachloroplatinate(IV) hexahydrate in pure water. The resulting aqueous solution was stirred for 30 minutes while keeping the temperature at 40° C. to carry out the reduction of the chloroplatinate.

After the reduction process, the aqueous solution was filtered and the particles precipitated in the aqueous solution were collected. The collected particles were washed and dried to obtain a fine metal particle-carrying catalyst in which metal particles were supported by conductive carrier particles. Hereinafter, the fine metal particle-carrying catalyst obtained by this process is referred to as Sample 1.

EXAMPLE 2

Here, an aqueous solution was prepared in the same manner as Sample 1 and after reducing the compounds in the aqueous solution, precipitated particles were collected. Here, however, hydrogen hexachloroplatinate(IV) hexahydrate was dissolved in the aqueous solution immediately (at about 0 minute to 20 minutes in this case) after adding the reducing agent to the aqueous nickel hydroxide solution. Hereinafter, the fine metal particle-carrying catalyst obtained by this process is referred to as Sample 2.

EXAMPLE 3

In this example, too, an aqueous solution was prepared in the same manner as Sample 1 and after reducing the compounds in the aqueous solution, precipitated particles were collected. Here, however, hydrogen hexachloroplatinate(IV) hexahydrate was dissolved in the aqueous solution twenty hours after adding the reducing agent to the aqueous nickel hydroxide solution. Hereinafter, the fine metal particle-carrying catalyst obtained by this process is referred to as Sample 3.

<TEM Analysis of Each Sample>

Figure 2:
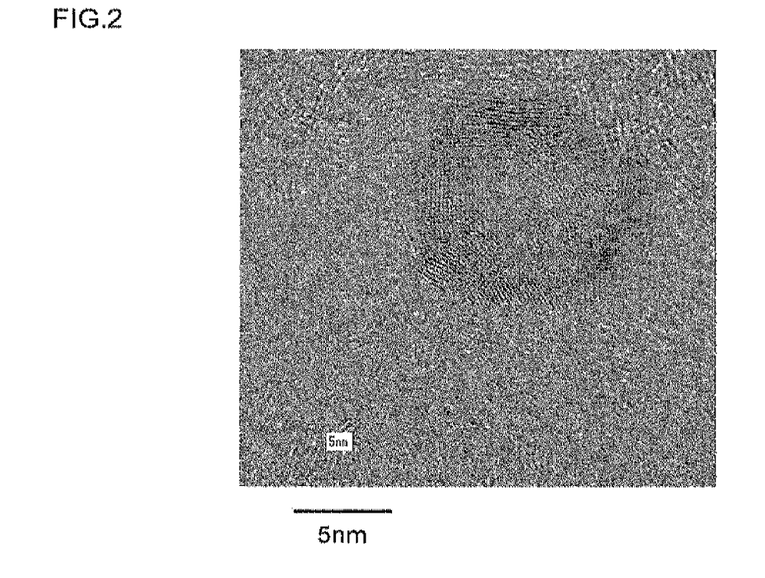
FIG. 2 shows a transmission electron microscopy (TEM) photo of Sample 1.
Figure 3:
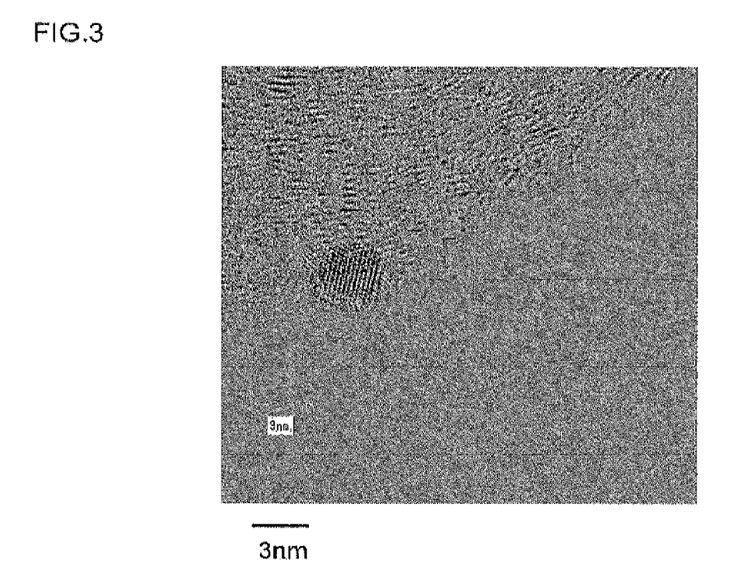
FIG. 3 shows a TEM photo of Sample 2.
Figure 4:
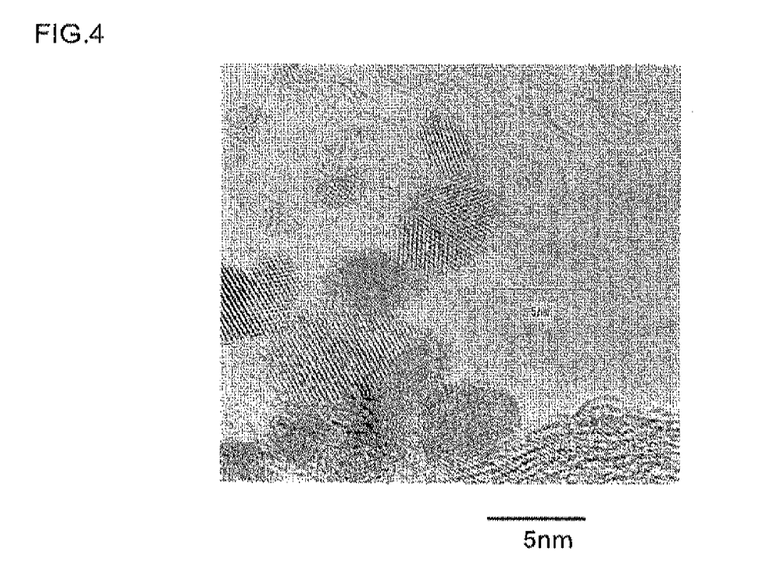
FIG. 4 shows a TEM photo of Sample 3.

Samples 1 to 3 obtained by the production processes described above were analyzed by transmission electron microscopy (hereinafter, referred to as "TEM"). The resulting TEM photos are shown in FIGS. 2 to 4. FIG. 2 shows a TEM photo of Sample 1, FIG. 3 shows that of Sample 2 and FIG. 4 shows that of Sample 3. In these TEM photos, transmission images of metal particles supported by a conductive carrier particle can be observed. Of the observed metal particles, the dark parts correspond to platinum and the portions lighter in color than that of platinum correspond to nickel.

As shown in FIG. 2, observation of the TEM photo of Sample 1 revealed that, in Sample 1, a fine nickel particle was formed at the central portion of a particle supported on carbon black (a conductive carrier particle) and the surface of the fine nickel particle was coated with fine platinum particles. Based on this, it can be said that the fine metal particles carried in Sample 1 are Ni—Pt core-shell structured metal particles in which fine nickel particles form the cores and their respective surfaces are coated with a shell comprising fine platinum particles. From this, it was found that by reducing a platinum compound to precipitate platinum after precipitating fine nickel particles via reduction of a nickel compound, preferable core-shell structured fine metal particles could be prepared.

On the other hand, as shown in FIG. 3, in the fine metal particles carried in Sample 2, fine platinum particles and fine nickel particles were present in a mixed state. Hence, the fine metal particles carried in Sample 2 can be elucidated as an alloy of platinum and nickel. From this, it was found that when the reductions of a nickel compound and a platinum compound were carried out almost at the same time, core-shell structured fine metal particles were not produced, but instead, an alloy of platinum and nickel was produced.

As shown in FIG. 4, in Sample 3, nickel particles and platinum particles were individually supported on a conductive carrier particle. From this, it was found that if the fluid reaction mixture was maintained for a long time after fine nickel particles had precipitated out, the reactivity on the surfaces of the fine nickel particles decreased and the core-shell structure was not formed.

<X-Ray Diffraction Analysis (XRD)>

Figure 5:
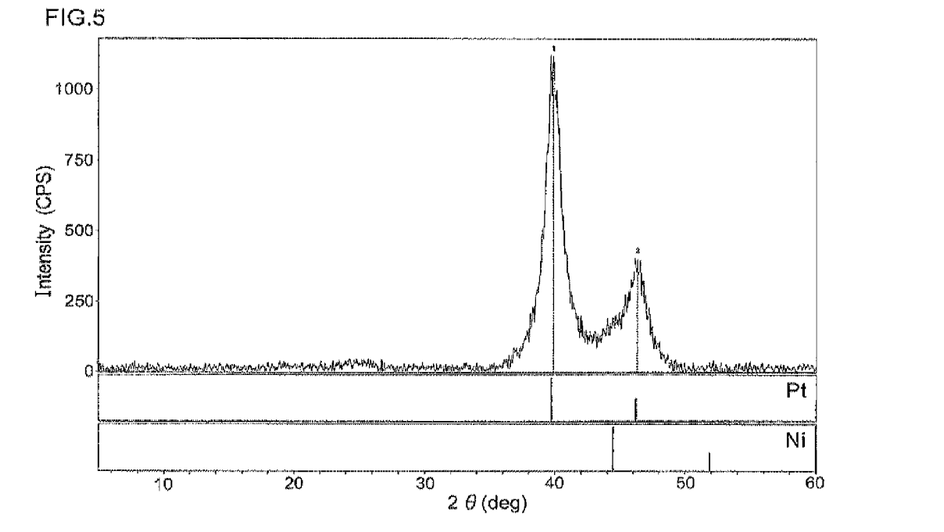
FIG. 5 shows a chart of X-ray diffraction analysis data of Sample 1.
Figure 6:
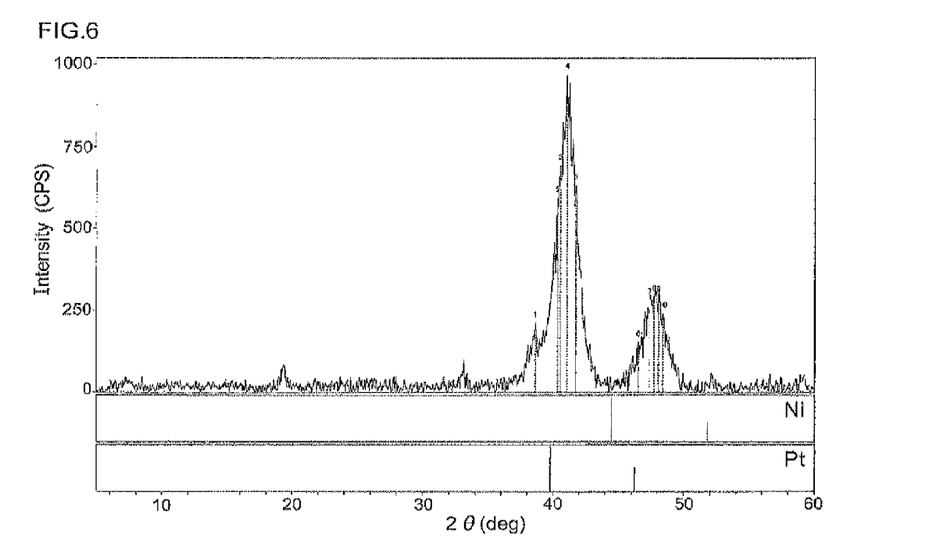
FIG. 6 shows a chart of X-ray diffraction analysis data of Sample 2.

XRD was conducted on Sample 1 and Sample 2; and the XRD peak values of the respective samples were analyzed. FIG. 5 shows the XRD data of Sample 1 and FIG. 6 shows the XRD data of Sample 2. In FIGS. 5 and 6, the XRD peak values corresponding to nickel and platinum are indicated as well.

As shown in FIG. 5, in the XRD data of Sample 1, were observed peak values that are same as those characteristic of nickel (around 44.4° and around 52°) and those characteristic of platinum (around 39° and around 47°). On the other hand, as shown in FIG. 6, in the XRD data of Sample 2, peaks were observed at values (around 42° and around 48°) that are different from either of the platinum and nickel peak values.

Based on the XRD data and the results of the TEM analysis, it was found that, in Sample 2, fine metal particles of a platinum-nickel alloy were obtained while, in Sample 1, core-shell structured fine metal particles comprising a core formed of nickel and a shell formed of platinum, respectively, were obtained.

<Evaluation of the Platinum Utilization Rate>

The platinum utilization rate of Sample 1 was compared to that of a commercial fine platinum particle-carrying catalyst (available from Tanaka Kikinzoku Kogyo, K. K., product number: TEC10E70TPM, which is hereinafter referred to as "Sample P") to evaluate the performance. Sample P is a catalyst in which a carrier particle supports fine metal particles composed solely of platinum.

With respect to Sample 1 and Sample P, the active surface areas of platinum were calculated based on the data obtained by cyclic voltammetry measurements (hereinafter referred to as "CV measurements"). Then, based on electron microscopy analysis, the average particle diameters of the fine metal particles carried in Sample 1 and Sample P were measured, respectively. Based on the active surface area of platinum and the average particle diameter data, the platinum utilization rate of each measurement subject was calculated. This platinum utilization rate is the product of the division of the active platinum surface area by the total surface area of the fine metal particles determined based on the average particle diameter. The results of the measurements for the active platinum surface area and the average particle diameter as well as the calculated platinum utilization rates are shown in Table 1.

TABLE 1

|  | Sample 1 | Sample P |
|---|---|---|
| Active surface area ($m^2/g$) | 34.1 | 71.7 |
| Average particle diameter (nm) | 10.58 | 3.36 |
| Platinum utilization rate (%) | 88.2 | 86.1 |

As shown in Table 1, Sample 1 had an active platinum surface area of 34.1 $m^2/g$ and an average particle diameter of 10.58 nm. Based on these data, the platinum utilization rate of Sample 1 was determined to be 88.2%. On the other hand, Sample P had an active platinum surface area of 71.7 $m^2/g$ and an average particle diameter of 3.36 nm. Based on these data, the platinum utilization rate of Sample P was determined to be 86.1%.

As these results show, no significant difference was observed between the platinum utilization rates of Sample 1 and Sample P. Base on this, it is considered that, by using the Ni/Pt core-shell structured fine metal particles as the catalyst, Sample 1 can exhibit catalytic performance equivalent to that of pure platinum catalyst. In other words, the fine metal particle-carrying catalyst obtained by the above-described production method allows reduction of the production cost while maintaining the good catalytic performance.

INDUSTRIAL APPLICABILITY

The fine metal particle-carrying catalyst provided by the production method disclosed herein can be used as a catalyst in various devices. For instance, it can be used in forming a catalytic layer of a polymer electrolyte fuel cell (PEFC). In this case, the production cost can be reduced while maintaining the performance of the PEFC.

REFERENCE SIGNS LIST 10 electrolyte membrane
20 fuel electrode
30 oxidizing agent electrode
40 fuel passing layer
50 oxidizing agent passing layer
60 case
100 electrode assembly (PEFC)

The invention claimed is:

1. A method for producing a fine metal particle-carrying catalyst comprising a carrier formed of a conductive material and core-shell structured fine metal particles supported on the carrier, wherein the shell portion is formed of a precious metal and the core portion is formed of a metal less precious than that of the shell portion, the method comprising:
   producing fine particles formed of a non-precious metal by subjecting a compound containing the core-forming non-precious metal element to reduction in a fluid reaction mixture in the presence of the carrier, but in absence of the precious metal while maintaining the temperature of the fluid reaction mixture in a range of 20° C. to 60° C.;
   forming a shell of the precious metal on the respective surfaces of the fine non-precious metal particles as the cores by adding a compound containing the shell-forming precious metal element to the fluid reaction mixture in which the carrier and the fine particles of the non-precious metal produced via the reduction are present and further reducing this compound while maintaining the temperature of the fluid reaction mixture in a range of 20° C. to 60° C., wherein the temperature of the reaction mixture is maintained in the range of 20° C. to 60° C. until after the shell of the precious metal is formed on the surfaces of the non-porous metal particles; and
   collecting, from the fluid reaction mixture, a catalyst in which fine metal particles are supported on the carrier, with each metal particle having the shell portion formed of the precious metal and the core portion formed of the non-precious metal.

2. The production method according to claim 1, wherein the compound containing a precious metal element is at least one selected from the group consisting of a salt or a complex of a metal belonging to the platinum group, and the compound containing a non-precious metal element is at least one selected from the group consisting of a salt or a complex of a metal belonging to the iron group.

3. The production method according to claim 2, wherein the compound containing a non-precious metal element comprises a nickel salt.

4. The production method according to claim 1, wherein fine particles of the non-precious metal are formed by adding a reducing agent to the fluid reaction mixture containing the compound having the non-precious metal element and the carrier; and a shell of the precious metal is formed on the respective surfaces of the fine particles of the non-precious metal by adding the compound containing a precious metal element to the fluid reaction mixture containing the formed fine particles.

5. The production method according to claim 1, wherein the carrier is formed of a conductive carbon.

6. The production method according to claim 4, wherein the reducing agent comprises at least one selected from the group consisting of sodium citrate dihydrate, oxalic acid, sodium acetate, sodium borohydride and sodium thiosulfate.

7. The production method according to claim 1, wherein the step of producing fine particles formed of a non-precious metal further comprises:
  forming a complex having the non-precious metal as the central metal ion by subjecting the compound containing the core-forming non-precious metal element and a complexing agent in the fluid reaction mixture in the presence of the carrier, but in absence of the precious metal, and maintaining the temperature of the fluid reaction mixture in a range of 20° C. to 60° C.; and
  reducing the fluid reaction mixture that comprises the complex.

8. The production method according to claim 7, wherein the complexing agent comprises at least one selected from the group consisting of hydrazine hydrate, aqueous ammonia and potassium cyanide.

9. The production method according to claim 7, wherein in the reducing step, the fluid reaction mixture is reduced by adding a reducing agent.

10. The production method according to claim 1, wherein in the fluid reaction mixture, the non-precious metal compound has a molarity of 0.5 M to 4 M, in order to produce core-shell structured fine metal particles having an average particle diameter of 3 nm to 15 nm.

* * * * *